Nov. 20, 1923.  
J. J. BISHOP  
1,474,399  
DIFFERENTIAL MECHANISM FOR AUTOMOBILE REAR AXLES  
Filed Feb. 18, 1922
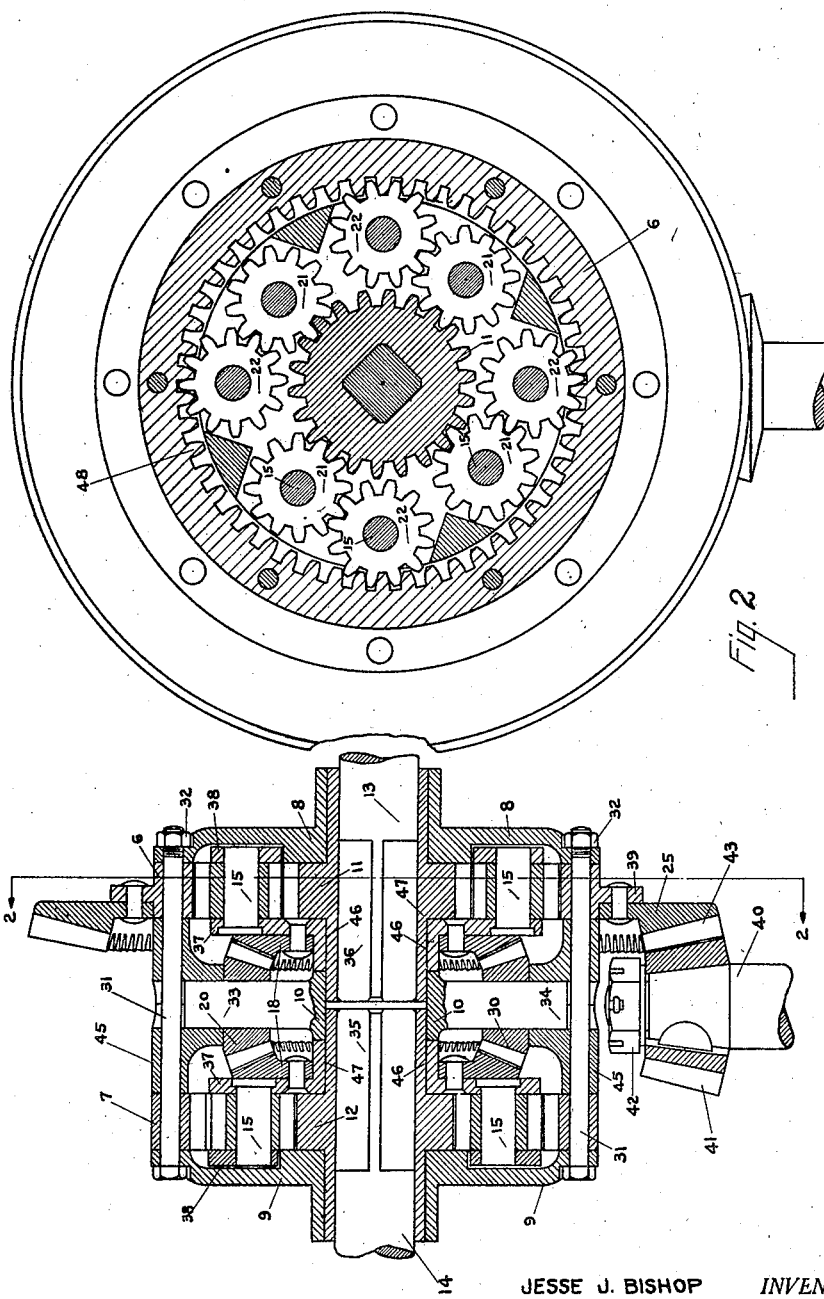
JESSE J. BISHOP  INVENTOR.
BY *Richey Slough & Fales*
HIS ATTORNEYS Patented Nov. 20, 1923.

1,474,399

UNITED STATES PATENT OFFICE.

JESSE J. BISHOP, OF ELYRIA, OHIO.

DIFFERENTIAL MECHANISM FOR AUTOMOBILE REAR AXLES.

Application filed February 18, 1922. Serial No. 537,420.

*To all whom it may concern:*

Be it known that I, JESSE J. BISHOP, a citizen of the United States, residing at Elyria, in the county of Lorain and State of Ohio, have invented certain new and useful Improvements in Differential Mechanisms for Automobile Rear Axles, of which the following is a full, clear, concise, and exact description, as will enable others skilled in the art to which my invention appertains to make and use the same.

My invention relates to differential mechanisms for automobile rear axles, and more particularly to such a driving mechanism which may be placed in the rear axle housing of a motor vehicle, and adapted to allow a free compensating action when one of the rear wheels of the automobile travels faster than the other, which may be occasioned by the uneven condition of the roadway, or by the conditions prevailing when turning a corner.

In differential gear mechanisms of the prior art in common use, the turning power exerted on the driving member, is transmitted to the driving shaft through a system of compensating pinions so held in place that any resistance created on either driving wheel would be equalized so that the driving power maintained by one wheel would only equal the resistance created by the other wheel.

An object of my invention is to provide a driving mechanism whereby the power from the automobile engine is transmitted to the driving wheels through two internal gear driving members in such a way that the driving power is not wasted as in prior constructions through an increased action of one of the wheels, whenever the conditions of the roadway are such as to require an unequal stress to be exerted on the driving members.

Another object of my invention is to provide a mechanism which will be compact, and which will attain the object above set forth, and other objects of my invention, in an efficient manner, and which will so distribute the strains and stresses to the various parts involved that undue wear and breakage of the various parts will be considerably reduced or eliminated.

Another object of my invention is to provide a structure of this kind wherein it is possible to easily assemble or dis-assemble the various operating parts as when assembling the machine in the first place, or when it is desired to have access to the various operating parts for purposes of inspection or repair.

Other objects of my invention, and the invention itself will be more apparent from the description thereof which follows; and in which description reference will be made to the accompanying drawings forming a part of my specification. In the drawings—

Fig. 1 is a horizontal section through a mechanism embodying my invention.

Fig. 2 is a section on the line 2—2 of Fig. 1, the view being taken looking in the direction of the arrows.

Referring now to the different figures in each of which like parts are designated by like reference characters, and which figures illustrate the differential gearing mechanism employed in a specific embodiment of my invention, and which are contained in the middle portion of the rear axle housing, the housing being omitted for a clearer disclosure of the various operating parts. This housing will include also the end of the driving propeller shaft 40 with a beveled gear pinion 41 secured on the end of the shaft 40 by a castle nut 42. The teeth of the pinion 41 engage with teeth 43 of a ring gear 25, said ring gear being secured to an outwardly projecting flange 39 carried by an internal ring or orbit gear member 6. The orbit gear member 6 is secured by bolts 31 and nuts 32 to the end frame members 8 and 9. The bolts 31 also serve to secure a second orbit member 7, and a spider supporting frame 45 carrying the spider 10 having spider arms 33 and 34. The spider arms 33 and 34 carry bevel gear pinions 20 and 30 journaled on the said arms, drive shafts 14 and 13 are provided extending in opposite directions through the end frame members 9 and 8 respectively, the driving shafts 13 and 14 extending to the rear wheels of the automobile, not shown but understood as being in operative driving connection with the ends of the said shafts. The inner ends 35 and 36 of the shafts 14 and 13 are herein shown as being substantially square in vertical cross section, although any suitable shape may be employed. Keyed on the ends of the said driving shafts are sun gears 12 and 11, the gear 12 being keyed or otherwise rigidly secured to the shaft 14, and the sun gear 11 being similarly secured to the end of the shaft 13.

For each driving shaft as 13 and 14, there is directly associated therewith a planetary gear mechanism, the mechanism for the shaft 13 comprising the sun gear 11 and the internal orbit gear 6, and between the said sun gear and the said internal orbit gear, there is disposed two sets of planet gears comprising alternately arranged gears 21 and 22, the gears 22 having teeth engaging directly with the teeth of the internal gear 6, and the teeth of the gears 21 engaging directly with the sun gear 11, and moreover, the gear pinions 21 and 22 are arranged in pairs, each pinion 22 having its teeth engaging a gear pinion 21 so that motion is transmitted from the orbit gear to the drive shaft through the teeth of the internal gear 6, the pinions 22 and 21 and the sun gear 11.

The planet gears 21 and 22 are carried in an annular cage comprising inner cage members 37, and outer cage members 38, and are supported on pins or pinion shafts 15 which interconnect the said inner and outer cage members 37 and 38.

The cage member 37 is journaled at 46 on the sun gear hub 47, and the spider 10 carrying the pinions 20 and 30 is likewise journaled on both of the hubs 47 of the sun gears 11 and 12, bridging the said hubs and occupying the space between the bearing flanges of the oppositely disposed inside gear cage members 37. Carried on the cage members 37 are ring gears 18 whose teeth engage the teeth of the beveled gears 20 and 30.

The mechanism of my invention as above described, when embodied in an automobile between the propeller shaft and the drive wheels, operates to prevent undue "spinning" of one of the rear wheels when the character of the terrain under such a wheel is such as to prevent the wheel from making firm contact so as to secure the benefit of good traction, and this is accomplished in such a way that such traction as may be had with such a wheel as might otherwise spin, is transmitted through the differential mechanism so as to prevent the driving power being wasted. In general, so far as I can determine, this is accomplished substantially as follows:

When power is applied to the driving gear 25, the ends 8 and 9, orbit gears 6 and 7, and spider 10, are carried as integral, and if the resistances on the driving shafts are equal, the planet gears 21, and 22 of each set are carried in a non-rotating manner, causing the planet cages 37, sun gears 11 and 12, and driving shafts 13 and 14 to rotate at the same speed and motion as the driving gear 25.

When the resistances on the driving shafts are equal and the travel of the wheels unequal, the planet gears of both sets travel in opposite directions, thereby equalizing the travel on the compensating pinions 20 and 30.

When power is applied to the driving gear 25, and the resistance on the driving shaft 13 is great enough to overcome the resistance on the driving shaft 14, the planet gears 21 revolve in an advance motion around the sun gear 11.

The planet gears 22 being in mesh with the planet gears 21 and the orbit gear 6, and turning in the opposite direction to that of the planet gears 21, are forced to advance on the inside periphery of the orbit gear 6 causing the corresponding planet gear cage 37 and the bevel gear 18 to travel faster and a retarding action to take place on the opposing bevel gear 18, and the corresponding planet gear cage 37.

The forward motion of the orbit gear 7 and the retarding action of the corresponding planet gear cage 37, will cause the planet gears 22 to revolve in the same direction as the driving gear 25, and will force the planet gears 21 to revolve in the opposite direction, thereby causing the sun gear 12 and the driving shaft 14 to revolve in the same direction but at twice the speed of the driving gear 25.

When an action takes place as before described, it may be seen that any resistance created by the wheel driven, by driving shaft 14, would be acting in opposition to the advance motion of the opposite planet gear cage 37, and as the speed of the wheel increases so also would the resistance increase, therefore the resistance on the driving shaft 13 would have to be several times greater than the resistance on the driving shaft 14 before an action would take place as before described, or in other words, an unequal stress would be exerted on the driving members.

It is clear that many changes may be made in the details of construction without departing from the spirit of my invention.

I claim as my invention:—

1. A differential mechanism comprising in combination with a pair of aligned driving shafts, supporting means rotatable about the axes of the said shafts, a pair of internally toothed orbit gears carried by the said supporting means, a pair of sun gears, each secured to an end of one of the said shafts, planet gears interposed between each orbit gear and the corresponding sun gear, a pair of planet gear supporting cages, each rotatable about the axis of each shaft, and compensating gearing interposed between the said planet gear cages.

2. A differential mechanism for the rear axle of an automobile, comprising in combination with a pair of longitudinally aligned driving shafts, one for each driving wheel of the automobile, a frame rotatable about the axis of the said shaft, said frame comprising a pair of spaced parallel internally toothed orbit gears, a driving ring gear carried on the outer rim of the said frame, a driving gear adapted to communicate motion from the automobile engine to the said ring gear, said frame and said parallel orbit gears being rotatable about the axes of the said shafts, a pair of sun gears, each sun gear being fixedly secured on an inner end of one of the said shafts, two sets of planet gears between each orbit gear and the corresponding sun gear, one of said sets comprising gears in engagement with the said orbit gear, and the other gear set comprising gears in engagement with the said sun gear, each of said sun gears engaging planet gears making driving engagement with one of the gears of said orbit gear engaging gear set, gear cages supporting the said planet gears and each being individually rotatable about the axis of its corresponding driving shaft, and compensating gearing interposed between the said planet gear cages.

3. A differential mechanism for the rear axle of an automobile, comprising in combination with a pair of longitudinally aligned driving shafts, one for each driving wheel of the automobile, a frame rotatable about the axis of the said shaft, said frame comprising a pair of spaced parallel internally toothed orbit gears, a driving ring gear carried on the outer rim of the said frame, a driving gear adapted to communicate motion from the automobile engine to the said ring gear, said frame and said parallel orbit gears being rotatable about the axes of the said shafts, a pair of sun gears, each sun gear being fixedly secured on an inner end of one of the said shafts, two sets of planet gears between each orbit gear and the corresponding sun gear, one of said sets comprising gears in engagement with the said orbit gear, and the other gear set comprising gears in engagement with the said sun gear, each of said sun gears engaging planet gears making driving engagement with one of the gears of said orbit gear engaging gear set, gear cages supporting the said planet gears and each being individually rotatable about the axis of its corresponding driving shaft, and compensating gearing interposed between the said planet gear cages, said compensating gearing comprising a rotatable spider rotatable about the axis of the aligned driving shafts, and comprising spider arms extending radially therefrom, and gear pinions carried on the said arms and journaled thereon, and ring gears, carried by each of said gear cages having oppositely faced teeth, said spider arm supporting pinions being interposed between the teeth of each of said last named ring gears.

4. A differential mechanism for the rear axle of an automobile, comprising an outer cage member, a pair of aligned driving shafts, said cage being adapted to be rotatable by the power of the automobile engine about the axis of the said shafts, said shafts being longitudinally aligned and having their inner ends closely adjoining, a planetary gear mechanism associated with each shaft and comprising a sun gear carried thereon, an orbit gear having internal teeth carried by the said cage near one side thereof, and interposed planet gears, said planet gears being in two sets, one of said sets having teeth engaging the teeth of said orbit gear and the other of said sets having teeth engaging the teeth of the said sun gear, adjacent gears of the one set having their teeth in driving engagement with the adjacent gears of the other set, compensating gearing between the two planetary gear mechanisms comprising a ring gear for each mechanism, said ring gear supporting the planetary gear sets thereof, and interposed gearing between the said ring gears, said interposed gearing comprising gears rotatable on spider arms extending radially of the said driving shaft axis, extending hub portions for the said sun gears, said ring gears being journaled on the said hub portions, said spider arms having a hub joining portion journaled on the laterally extending portions of the said ring gear journals.

5. An automobile rear axle differential mechanism comprising a pair of driving shafts, a pair of planetary gear mechanisms concentric with the said shafts, and parallel to each other, gear cages supporting the planet gears of each planetary gear mechanism, and compensating gearing between the said cages, the planet gears of the said mechanism being in two sets, one of which comprises gears in driving relation with the orbit gear, and the other comprising gears in driving relation with the sun gear of the said mechanism, said gears of the two sets being in driving relation with each other.

In witness whereof I have hereunto signed my name this 16th day of February, 1922.

JESSE J. BISHOP.